United States Patent [19]
Kunze et al.

[11] Patent Number: 5,765,741
[45] Date of Patent: Jun. 16, 1998

[54] SWITCHING DEVICE FOR AN AUTO-REVERSE DECK OF A MAGNETIC TAPE CASSETTE APPARATUS

[75] Inventors: Norbert Kunze, Diez; Stefan Koch, Bad Endbach, both of Germany

[73] Assignee: U.S. Philips Corporation, New York, N.Y.

[21] Appl. No.: 788,735

[22] Filed: Jan. 23, 1997

[30] Foreign Application Priority Data

Jan. 26, 1996 [DE] Germany .................. 196 02 743.8

[51] Int. Cl.⁶ .................. G03B 19/04; B65H 20/24
[52] U.S. Cl. .................. 226/50; 242/354.1; 360/96.2
[58] Field of Search .................. 226/49, 50, 51; 242/354.1, 356.5; 360/96.2

[56] References Cited

U.S. PATENT DOCUMENTS

| | | | |
|---|---|---|---|
| 3,490,666 | 1/1970 | Takashino | 226/50 X |
| 4,291,348 | 9/1981 | Pera | 242/354.1 X |
| 4,932,605 | 6/1990 | Klos-Hein et al. | 242/354.1 |
| 5,144,507 | 9/1992 | Kurita | 360/96.2 |
| 5,276,271 | 1/1994 | Kurita | 360/96.2 X |

FOREIGN PATENT DOCUMENTS

0467371A2  9/1992  European Pat. Off. .

*Primary Examiner*—Michael Mansen
*Attorney, Agent, or Firm*—Michael E. Belk

[57] ABSTRACT

A switching device in an auto-reverse deck for a magnetic-tape-cassette apparatus, in which a first pressure roller (24) mounted on a first pressure-roller lever (20), for a first tape-transport direction, can be applied to a first capstan (36) in a first operating position of the switching device and a second pressure roller (25) mounted on a second pressure-roller lever (21), for a second tape-transport direction, can be applied to a second capstan (37) in a second operating position of the switching device, in which a magnetic head is arrangeable on a carrier element (2) mounted on a deck plate (1) and is movable in different positions relative to a transport path of a magnetic tape.

13 Claims, 6 Drawing Sheets

SWITCHING DEVICE FOR AN AUTO-REVERSE DECK OF A MAGNETIC TAPE CASSETTE APPARATUS

BACKGROUND OF THE INVENTION

The invention relates to a switching device in an auto-reverse deck for a magnetic-tape-cassette apparatus. A first pressure roller mounted on a first pressureroller lever, for a first tape-transport direction, is applied to a first capstan in a first operating position of the switching device. Also, a second pressure roller mounted on a second pressure-roller lever, for a second tape-transport direction, is applied to a second capstan in a second operating position of the switching device, in which a magnetic head is arrangeable on a carrier element mounted on a deck plate and is movable in different positions relative to a transport path of a magnetic tape.

Such a switching device is known from EP 467 371 A2. This known device includes a carrier element which is supported on the deck plate so as to be movable in a direction perpendicular to the transport path of the magnetic tape. A reversing plate is mounted on the carrier element so as to be movable in a direction parallel to the transport path of the magnetic tape. This reversing plate is spring-loaded in a preferred direction. The carrier element can be moved by a first actuating cam and the reversing plate by a second actuating cam. For the first tape-transport direction the reversing plate acts on the first pressure-roller lever and presses the first pressure roller against the first capstan. For the second tape-transport direction the reversing plate acts on the second pressure-roller lever and presses the second pressure roller against the second capstan. For this, the reversing plate should first apply a force to move the pressure roller and the pressure-roller lever towards the capstan against a spring load and, subsequently, the force for pressing the pressure roller against the capstan. In the play mode the reversing plate determines the position of each time only one of the two pressure rollers, the other pressure roller is urged away from its associated capstan by spring force. Such a construction is very costly, intricate and vulnerable. It is not unlikely that jamming or interlocking can occur during the movement of the carrier element relative to the deck plate and the reversing plate relative to the carrier element. Besides, such a construction can only be used for carrier elements which are moved perpendicularly to the transport path of the magnetic tape. For example, it is not possible to use such a construction for carrier elements which are pivotable about a pivot situated at the periphery of the deck plate. A further drawback of this known construction is that for moving the carrier element and for moving the reversing plate, two separate actuating cams are required.

SUMMARY OF THE INVENTION

It is an object of the invention to provide a device of the type defined in the opening paragraph, which is simple, cheap and reliable and in which the force applied by the switching device for the actuation of the pressure rollers is minimal.

According to the invention this object is achieved in that an actuating lever, which is rotatably and/or translatably mounted on the carrier element, is coupled to the first and the second pressure-roller lever, the actuating lever is set from one operating position to the other operating position when the tape-transport direction is changed. The pressure-roller levers are moved from one operating position into the other operating position when the tape-transport direction is changed by the actuating lever. The position of the two pressure-roller levers is determined by the position of the actuating lever in the first and in the second tape-transport direction.

The rotatable and/or translatable mounting of the actuating lever on the carrier element makes it possible to use this switching device in conjunction with carrier elements. The carrier elements are mounted on the deck plate in a variety of manners and so as to be movable relative to the deck plate. Such a switching device can be used, in particular, for a carrier element mounted on a pivot situated at the periphery of the deck plate. A pivotable mounting of the actuating lever on the carrier element enables a reliable and dependable switching without the risk of jamming or canting. The direct coupling of the actuating lever to the first and the second pressure-roller lever enables both pressure-roller levers to be positioned directly by the movement of the actuating lever. If the actuating lever is set from one operating position to the other operating position when the tape-transport direction is changed, this causes the pressure-roller levers to be moved at the same time from one operating position into the other operating position by the actuating lever. Setting the actuating lever from one operating position to the other operating position is possible, for example, by using a pivotable drive mechanism which acts upon the actuating lever when the tape-transport direction is changed. It is also possible to set the actuating lever from one operating position to the other operating position by using a motor-driven actuating cam when the tape-transport direction is changed. As a result of the coupling of the actuating lever to the first and the second pressure roller the position of the actuating lever determines both the position of the pressure-roller lever applied to its associated capstan and the position of the pressure-roller lever which is clear of the capstan in the first and the second tape-transport direction, respectively. Therefore, it is not necessary to provide withdrawal means, for example pre-tensioned springs, to ensure that the pressure roller is withdrawn from its associated capstan. As a result of this, the pressure rollers can be positioned with a very small force, by the actuating lever. The coupling of the pressure-roller levers to the actuating lever to transmit a movement of the carrier element which produces a corresponding movement of the actuating lever through a movement of the pressure-roller levers. This makes it possible, for example when the carrier element is moved from a play position to a music search position, to withdraw the relevant pressure roller from its associated capstan, which is necessary, by using the actuating lever. The entire construction is simple, cheap and reliable.

An advantageous embodiment of the invention is characterized in that the pressure rollers are each movable in a slot in the pressure-roller lever, and the pressure rollers and the pressure-roller levers are restrained relative to one another by means of a spring.

The advantage of this construction is that the individual springs position the axes of the pressure rollers in such a manner relative to the capstans that the capstan axis and the pressure-roller axis extend substantially parallel to one another perpendicularly to the tape-transport direction without the use of any additional means.

The two units a pressure roller, pressure-roller lever and spring each form an inherently closed system of forces, which in principle exerts a force on the switching device or the actuating lever only when applied to the associated capstan. The unit which is not in contact with the capstan exerts substantially no force on the switching device and the actuating lever.

The spring is preferably fork-shaped, the two mutually independent but equal spring forces acting on the pressure-roller spindle on the upper end and the lower end of the pressure roller.

A further preferred embodiment of the invention is characterized in that the first pressure-roller lever and the second pressure-roller lever are mounted on the deck plate so as to be pivotable about a first pivot and a second pivot, respectively. The first and the second pivot are disposed between normals which extend from the first and the second capstan perpendicularly to a line interconnecting the bearing points of the capstans.

If the first and the second pivot of the pressure-roller levers are situated between the two pressure rollers. The resultant force exerted on the relevant pressure-roller lever by the pressure roller applied to a capstan is directed away from the pivot of the relevant pressure-roller lever. This results in an alignment effect which causes the relevant pressure-roller lever to align itself automatically (weathercock effect).

A further advantageous embodiment of the invention is characterized in that the first and the second pressure-roller lever are supported on a deck plate so as to be pivotable about a common pivot. The common pivot is positioned substantially on the midperpendicular to the line interconnecting the first and the second capstan. This saves parts.

Such a mounting of the pressure-roller levers further has the advantage that the lever arm between the pressure-roller lever and the pressure rollers is maximal.

Moreover, this embodiment of the invention also provides automatic alignment as a result of the weathercock effect.

Another advantageous embodiment of the invention is characterized in that the first and the second pressure-roller lever each includes a guide element which engages in a guide opening in the actuating lever.

Such a construction can be implemented in a particularly simple, cheap and reliable manner and is preferably implemented in that the guide elements are projections and the guide openings are slots.

A further advantageous embodiment of the invention is characterized in that the actuating lever has stop surfaces which, centered in the height direction of the pressure rollers, are engageable against stop elements mounted on the pressure-roller levers.

Thus, it is avoided that forces issuing from the pressure roller and acting on the mechanism cause tilting perpendicularly to the pivotal axis of the pressure-roller lever.

A further advantageous embodiment of the invention is characterized in that the actuating lever is pivotably mounted on the carrier element.

A pivotable mounting of the actuating lever on the carrier element is particularly simple and reliable.

A further advantageous embodiment of the invention is characterized in that the position of the actuating lever in the first and the second operating position of the switching device is defined by reference elements arranged on the deck plate.

Such a device enables a very high positioning accuracy of the actuating lever and, consequently, of the pressure-roller lever and the pressure rollers to be achieved.

A further advantageous embodiment of the invention is characterized in that upon a reversal of the tape-transport direction the carrier element and, consequently, the actuating lever mounted on this carrier element are initially moved away from the transport path of the magnetic tape, subsequently the actuating lever and the pressure-roller levers are pivoted and then the carrier element and the actuating lever are moved towards the transport path of the magnetic tape.

A further advantageous embodiment of the invention is characterized in that the switching device includes a drive mechanism which is pivotable in a pivoting range between two reel-disc wheels. Using the drive mechanism, a first reel-disc wheel is drivable in the first operating position and a second reel-disc wheel is drivable in the second operating position. The actuating lever has teeth which are engageable with a pivotal wheel of the pivotable drive mechanism, the actuating-lever teeth and the pivotal are being in mesh in a central part of the pivoting range and are not in mesh in an initial part and a final part of the pivoting range. As a result the pivoting drive mechanism exerts a force on the actuating lever by means of the pivotal wheel only in the central part of the pivoting range.

A further advantageous embodiment of the invention is characterized in that the pivotal wheel is mounted on a pivotal lever, which is coupled to an intermediate wheel by means of a frictional force. The can be transmitted by a friction coupling, which intermediate wheel meshes with the pivotal wheel, the pivotal wheel is pivoted in the initial and the final part of the pivoting range by the frictional force transmitted by the friction coupling. A pivotably supported armature lever has been provided whose pivotal movement is controlled by the movement of the actuating lever, the pivoting pivotal lever engages against a stop edge of the armature lever in the central part of the pivoting range, so that subsequently, owing to the engagement of the pivotal lever against the stop edge of the armature lever, meshing forces are transmitted to the teeth of the actuating lever by means of the intermediate wheel and the pivotal wheel. As a result the actuating lever is pivoted.

In an initial and a final part of the pivoting range the pivotal lever is pivoted, for example, by means of the frictional force transmitted by the friction coupling. In the central part of the pivoting range the pivoting pivotal lever acts upon a stop edge of the armature lever. In this central part of the pivoting range the teeth of the actuating lever are in mesh with the teeth of the pivotal wheel. Subsequently, the pivotal lever can abut against the stop edge of the armature lever and meshing forces can be transmitted to the teeth of the actuating lever by means of the intermediate wheel and the pivotal wheel. These forces transmitted to the actuating lever by means of the meshing forces are distinctly larger than the frictional forces which can be transmitted by means of the friction coupling. Thus, it is possible to activate also apparatus functions requiring a high power, for example, the changeover of the pressure-roller lever, by using the actuating lever in the central part of the pivoting range. By using such a device it is possible to obtain a large pivoting range of the actuating lever.

In a further advantageous embodiment of the invention the armature lever is pivotably supported on the deck plate.

The pivotal movement of the armature lever is preferably controlled using of the movement of the actuating lever in that the armature lever comprises a guide element which engages in a guide opening in the actuating lever or the actuating lever has a guide element which engages in a guide opening in the armature lever. Such a construction can be implemented in a simple, cheap and reliable manner.

In a further advantageous embodiment of the invention the guide opening in the actuating lever is a slot having two parts of different width, the width of the slot in a narrow first part corresponding substantially to the width of the guide element and the width of the slot in a broad second part being larger than the width of the guide element.

The provision of a slot enables the actuating lever to be shifted relative to the armature lever. When the guide element is disposed in the narrow part of the slot, a pivotal movement of the actuating lever is converted into a pivotal movement of the armature lever. When the guide element is disposed in the broad part of the slot, the actuating lever can pivot within this broad part without acting upon the armature lever.

Preferably, a switching device in accordance with the invention is used in a tape deck or in a magnetic-tape-cassette apparatus including a tape deck.

DETAILED DESCRIPTION OF THE PREFERRED EMBODIMENTS

Figure 1:
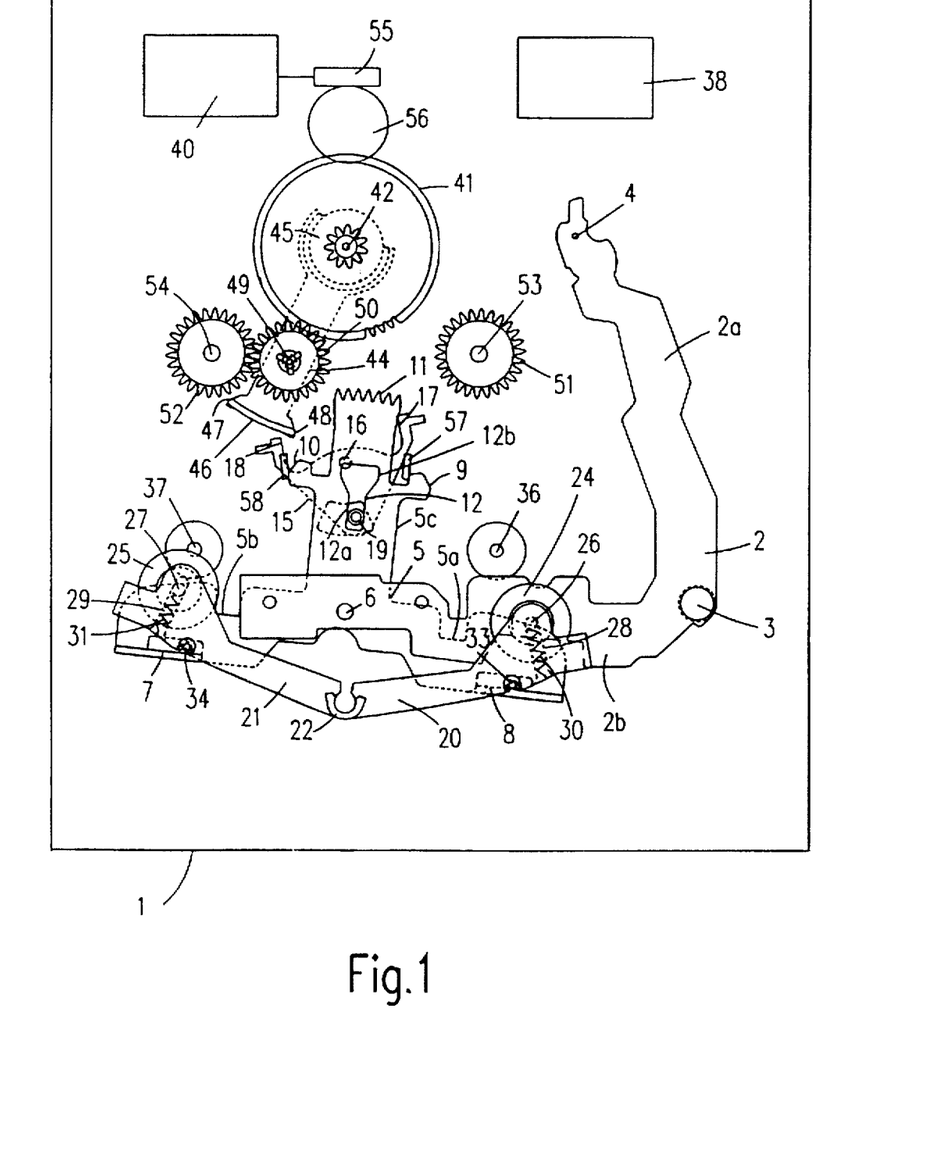
FIG. 1 is a plan view of parts of an auto-reverse deck of a magnetic-tape-cassette apparatus comprising a switching device for pressure rollers which are supported on pressure roller levers and which are engageable with capstans, and comprising a drive mechanism which is pivotable between two reel-disc wheels in a first tape transport direction (Play REV).
Figure 2:
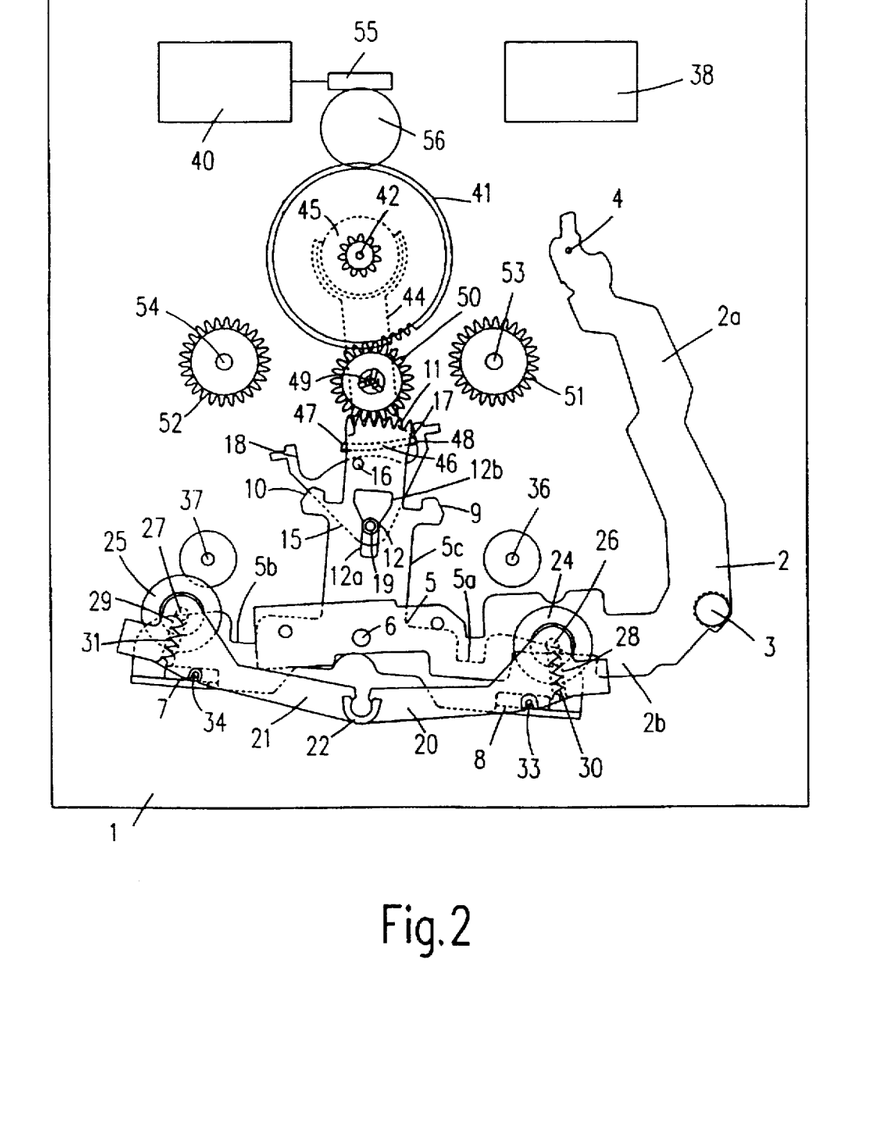
FIG. 2 is a plan view of parts of the auto-reverse deck, the deck being in a first intermediate position during the change-over from the first tape transport direction (Play REV) to a second tape transport direction (Play NOR), in which position the pivotal movement of a pivotal lever is braked by an armature lever.

FIGS. 1, 2, 3, 4 and 5 diagrammatically show parts of an auto-reverse deck in plan views in different modes of operation. FIG. 1 shows the operating position for a first tape transport direction (Play REV). The tape deck in accordance with the invention shown in FIG. 1 comprises a chassis formed by a deck plate 1, on which a carrier element 2 is mounted so as to be pivotable about a pivot 3. The carrier element 2 has a limb 2a and a limb 2b. The limb 2a of the carrier element 2 carries a guide pin 4. This guide pin 2c engages a cam profile, not shown, of a cam disc, not shown. This cam disc, not shown, exerts the forces required for pivoting the carrier element 2 about the pivot 3 on the guide pin 4c. A magnetic-head tape-guide unit, not shown, is supported on the carrier element 2. The magnetic-head tape-guide unit, not shown, can be moved towards a magnetic tape, not shown, in a magnetic-tape cassette by turning the carrier element 2 about the pivot 3. An actuating lever 5 is supported on the carrier element 2 so as to be pivotable about a pivot 6. The actuating lever 5 is T-shaped and has two transverse limbs 5a and 5b as well as a central limb 5c. The transverse limbs 5a and 5b of the actuating lever 5 each have a slot 7 and 8, respectively. On one side the central limb 5c of the actuating lever 5 has a projection 9 and on the opposite side it has a projection 10. The end face of the central limb 5c is formed with actuating-lever teeth 11. The central limb 5c of the actuating lever 5 has a guide opening in the form of an actuating-lever slot 12, which is a longitudinal slot and has a narrow part 12a and a broad part 12b.

An armature lever 15 is mounted on the deck plate 1 so as to be pivotable about a pivot 16. The armature lever 15 has two projections 17 and 18 and a guide element formed by an armature-lever pin 19, which engages the actuating-lever slot 12 in the actuating lever 5.

A first pressure-roller lever 20 and a second pressure-roller lever 21 are mounted on the deck plate 1 so as to be pivotable about a common pivot 22. As an alternative, the pressure-roller levers 20 and 21 can be mounted on spaced-apart pivots (not shown). The free end of the first pressure-roller lever 20 carries a first pressure roller 24 and the free end of the second pressure-roller lever 21 carries a second pressure roller 25. The first pressure roller 24 has a first central pin 26 and the second pressure roller 25 has a second central pin 27. The first central pin 26 is movable in a slot 28 in the first pressure-roller lever 20 and is restrained relative to the first pressure-roller lever 20 by means of a spring 30, which is shown diagrammatically. The second central pin 27 is movable in a slot 29 in the second pressure-roller lever 21 and is restrained relative to the first pressure-roller lever 21 by means of a spring 31. The first pressure-roller lever 20 has a projection 33, which engages in the slot 8 of the actuating lever 5. The second pressure-roller lever 21 has a projection 34, which engages in the slot 7 of the actuating lever 5.

The deck plate 1 carries two capstans 36 and 37 coupled to flywheels, not shown. A reversible capstan motor 38 serves to drive the capstans 36 and 37. The capstan motor 38 drives the capstans 36 and 37 by means of a belt, not shown, which is wrapped around the flywheels, not shown, in a manner which is not shown.

In addition to the capstan motor 38 there is provided a reversible servo motor 40, which can drive an intermediate wheel 41 in two directions about a shaft 42 mounted on the deck plate 1 by means of a worm shaft 55 and a reduction gear wheel 56. In addition to the intermediate wheel 41, a pivotal lever 44 is mounted for rotation about the shaft 42. The intermediate wheel 41 and the pivotal lever 44 are coupled to one another via a friction coupling 45. The pivotal lever 44 has an end face 46 with two lateral edges 47 and 48. Moreover, the pivotal lever 44 carries a pivotal-lever pin 49 about which a pivotal wheel 50 is rotatable. The pivotal wheel 50 can selectively be brought in mesh with a first reel-disc wheel 51 and a second reel-disc wheel 52 by a pivotal movement of the pivotal lever 44. The first reel-disc wheel 51 is rotatable about a shaft 53 and the second reel-disc wheel 52 is rotatable about a shaft 54 mounted on the deck plate 1. The reel-disc wheels 51 and 52 are engageable in openings, not shown, in a magnetic-tape cassette, not shown. The deck plate 1 carries two chassis stops 57 and 58 against which the projections 9 and 10 of the actuating lever 5 can be urged.

In the mode of operation (Play REV) illustrated in FIG. 1 the servo motor 40 drives the second reel-disc wheel 52 by means of the worm shaft 55, the reduction gear wheel 56, the intermediate wheel 41 and the pivotal wheel 50. At the same time the capstan motor 38 drives flywheels, not shown, of the capstans 36 and 37 via belts, not shown. As a result of this, the magnetic tape is moved in the first tape transport direction (Play REV) by the capstan 37 and the second pressure roller 25, which is pressed against the capstan 37. When the second pressure roller 25 is applied to the capstan 37 the second central pin 27 is moved in the slot 29 in the second pressure-roller lever 21 and the spring 31 is tensioned relative to the second pressure-roller lever 21. As a result, the second pressure roller 25, while applied to the capstan 37, exerts a force on the actuating lever 5 by means of the spring 31, the second pressure-roller lever 21, and the projection 34 of the pressure-roller lever 21, the actuating lever in its turn exerting a force on the carrier element 2. The first pressure roller 24 and the pressure-roller lever 20 do not exert any force on the actuating lever 5 and, consequently, do not exert any force on the carrier element 2 in the Play REV mode.

Hereinafter, the change-over from the first tape-transport direction (Play REV) to the opposite tape-transport direction (PLAY NOR) will be described in more detail. Starting from the first tape-transport direction (Play REV) represented in FIG. 1, the carrier element is rotated counter-clockwise by the cooperation of the cam disc, not shown, with the guide pin 4 of the carrier element 2, said element being rotated until the projections 9 and 10 of the actuating lever 5 no longer act upon the chassis stops 57 and 58, as a result of which the position of the actuating lever 5 is no longer dictated by the chassis stops 57 and 58. The further switching process is now started by the servo motor 40. The servo motor 40 now reverses, i.e. its direction of rotation is changed, and drives the intermediate wheel 41 via the worm shaft 55 and the reduction gear wheel 56 in such a manner that this intermediate wheel is rotated counter-clockwise. The intermediate wheel 41, which rotates counterclockwise, exerts a counter-clockwise force on the pivotal lever 44 by means of the friction coupling 45, thereby causing the pivotal lever 44 to be moved in a counter-clockwise direction towards the teeth 11 of the actuating lever 5. As the pivotal lever 44 is pivoted further the teeth of the pivotal wheel 50 mesh with the teeth 11 of the actuating lever 5. Subsequently, owing to the friction torque exerted by the friction coupling 45, the pivotal lever 44 is moved further counter-clockwise until its lateral edge 48 abuts against the projection 17 of the armature lever 15. This is the position shown in FIG. 2.

Figure 3:
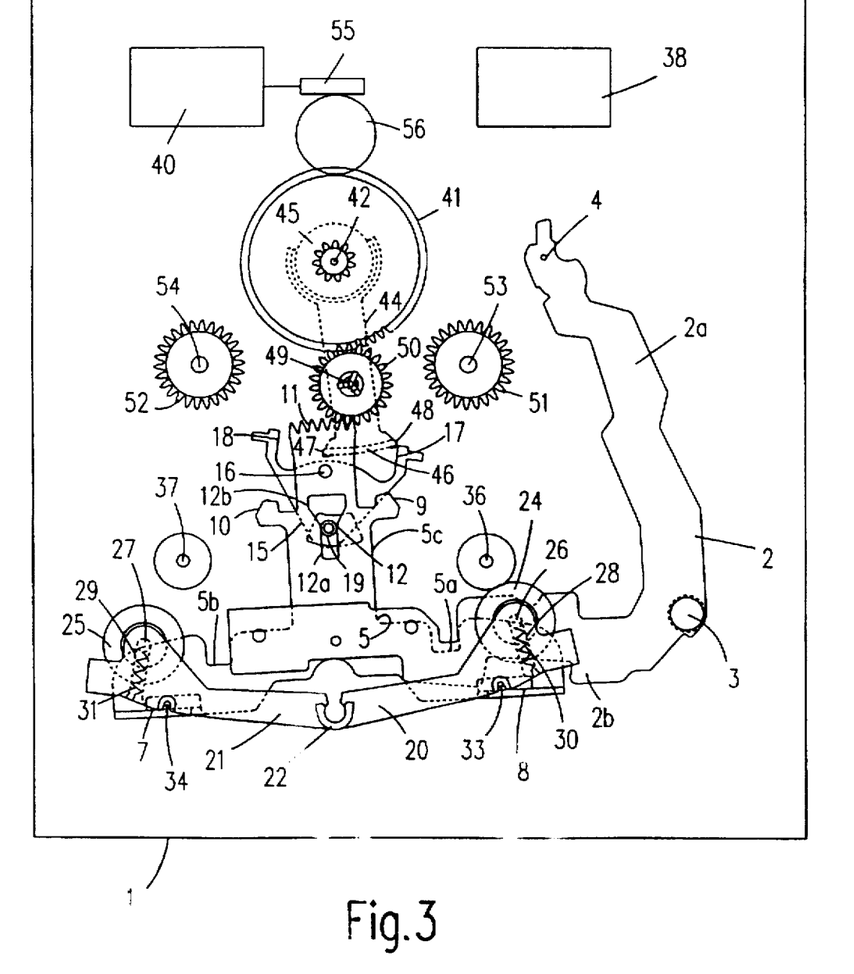
FIG. 3 is a plan view of parts of the auto-reverse deck, the deck being in a second intermediate position during the change-over between the first tape transport direction (PLay REV) and the second tape transport direction (Play NOR), in which position the armature lever just releases the pivotal lever.

As a result of the abutment of the lateral edge 48 against the projection 17 of the armature lever 15 the free pivotal movement of the pivotal lever 44, caused by the friction torque exerted on the pivotal lever 44 by means of the intermediate wheel 41 and the friction coupling 45, stops. Since the pivotal lever 44 can subsequently abut against the armature lever 15 in a central part of the pivoting range, the rotatory forces of the intermediate wheel 41 can be transmitted directly, through the meshing forces, from the teeth of the intermediate wheel 41 to the teeth of the pivotal wheel 50 and from the teeth of the pivotal wheel 50 to the actuating-lever teeth 11 of the actuating lever 5. The actuating lever 5 is thus pivoted counter-clockwise by means of the meshing forces, which are distinctly larger than the forces which can be transmitted by means of the friction coupling. The pivoting actuating lever 5 acts upon the armature-lever pin 19 via its actuating-lever slot 12, as a result of which the armature lever 15 is rotated clockwise about its pivot 16. Owing to the meshing forces between the pivotal wheel 50 and the teeth 11 of the actuating lever 5 the pivotal lever 44 follows the projection 17 of the armature lever 15 with its the lateral edge 48 until the projection 17 of the armature lever 15 releases the lateral edge 48 of the pivotal lever 44. This position of the actuating lever 5, the armature lever 15 and the pivotal lever 44 is shown in FIG. 3.

As soon as the projection 17 of the armature lever 15 releases the lateral edge 48 of the pivotal lever 44, the pivotal lever 44 can no longer abut against the armature lever 15 and, consequently, the rotatory force of the intermediate wheel 41 can no longer be transmitted to the teeth 11 of the actuating lever 5 through the meshing forces. In a subsequent final part of the pivoting range the pivotal lever 44 is therefore only pivoted by means of the friction torque applied by the friction coupling 45. As the pivotal lever 44 is pivoted further the teeth of the pivotal wheel 50 become disengaged from the actuating-lever teeth 11 of the actuating lever 5 and, as a result of the friction torque applied by the friction coupling 45, the pivotal lever 44 with the pivotal wheel 50 is pivoted counter-clockwise to mesh with the teeth of the reel-disc wheel 51. The meshing forces between the reel-disc wheel 51, the pivotal wheel 50 and the intermediate wheel 41 are self-engaging.

Figure 4:
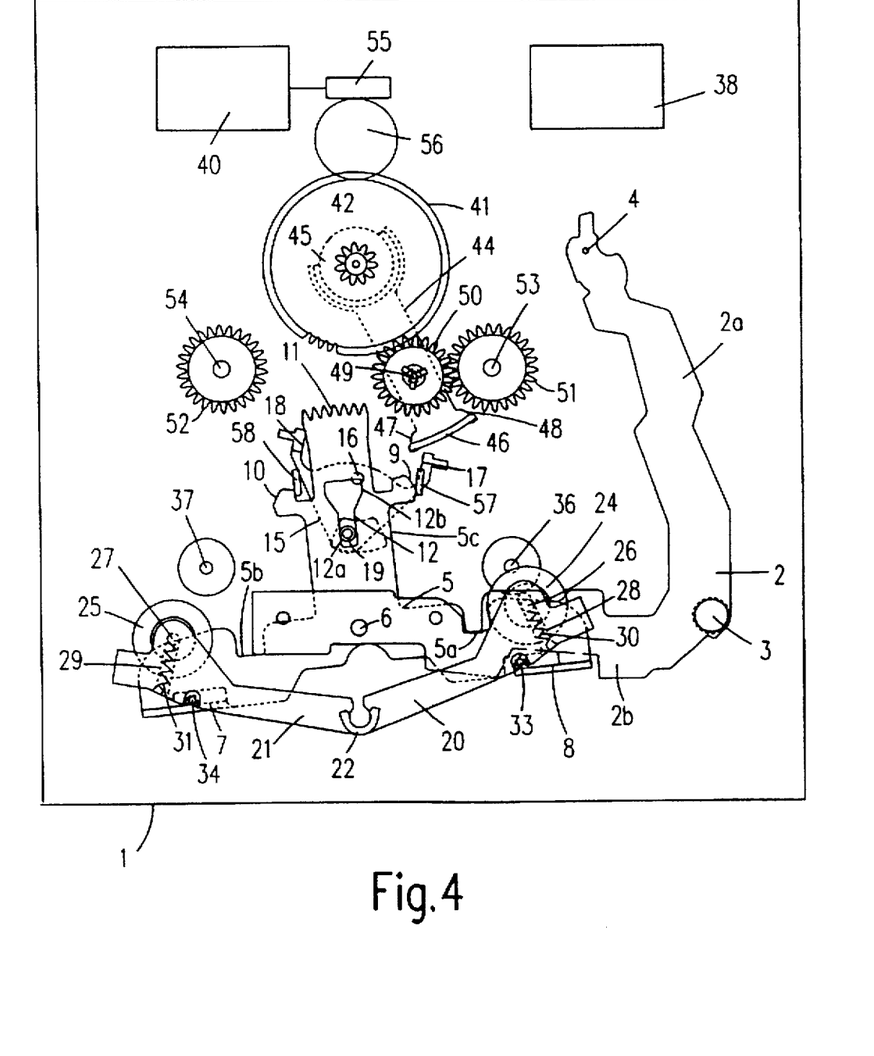
FIG. 4 is a plan view of parts of the auto-reverse deck in the second tape transport direction (Play NOR).

Subsequently, the carrier element 2 is pivoted clockwise in that the cam profile, not shown, of the cam disc, not shown, acts upon the guide pin 5 mounted on the end of the limb 2a. When the carrier element 2 is pivoted the actuating lever 5, which is mounted on the carrier element 2 so as to be pivotable about the pivot 6, is moved towards the reel-disc wheels 53 and 54. The right-hand projection 9 of the actuating lever 5 then engages against the left-hand side of the chassis stop 57 and slides along this stop. When the carrier element 2 has been pivoted into the play position for the second tape-transport direction (Play NOR), the actuating lever 5 also assumes the operating position for Play NOR, which position is determined by the position of the carrier element 2 and by the chassis stops 57 and 58. During the movement of the actuating lever 5 from the Play REV position to the Play NOR position the pressure-roller levers 20 and 21 are at the same time moved from the operating position for the first tape-transport direction (Play REV) to the operating position for the second tape-transport direction (Play NOR) by means of the projections 33 and 34 of the pressure-roller levers 20 and 21, which are guided in the slots 7 and 8 of the actuating lever 5. As a result of this, the right-hand pressure roller 24 is applied to the right-hand capstan 36 and the magnetic tape is moved in the NOR direction. When the first pressure roller 24 is applied to the capstan 36 the first central pin 26 is moved in the slot 28 of the first pressure-roller lever 20 and the spring 30 is tensioned relative to the first pressure-roller lever 20. As a result, the first pressure roller 24, which engages with the capstan 36, exerts a force on the actuating lever 5 by means of the spring 30, the first pressure-roller lever 20 and the projection 33 of the pressure-roller lever 20, the actuating lever 5 in its turn exerting a force on the carrier element 2. In the Play NOR mode the second pressure roller 25 and the second pressure-roller lever 21 do not exert any force on the actuating lever 5 and, consequently, neither on the carrier element 2. Thus, only the first pressure roller 24, which should be applied to the capstan 36 for the transport of the magnetic tape in the Play NOR mode, exerts a force on the actuating lever 5 and the carrier element 2 while being pressed against this capstan 36. Conversely, the second pressure roller 25, which actually has no function in the Play NOR mode, "freewheels" and does not exert any force on the actuating lever 5 and the carrier element 2.

Figure 5:
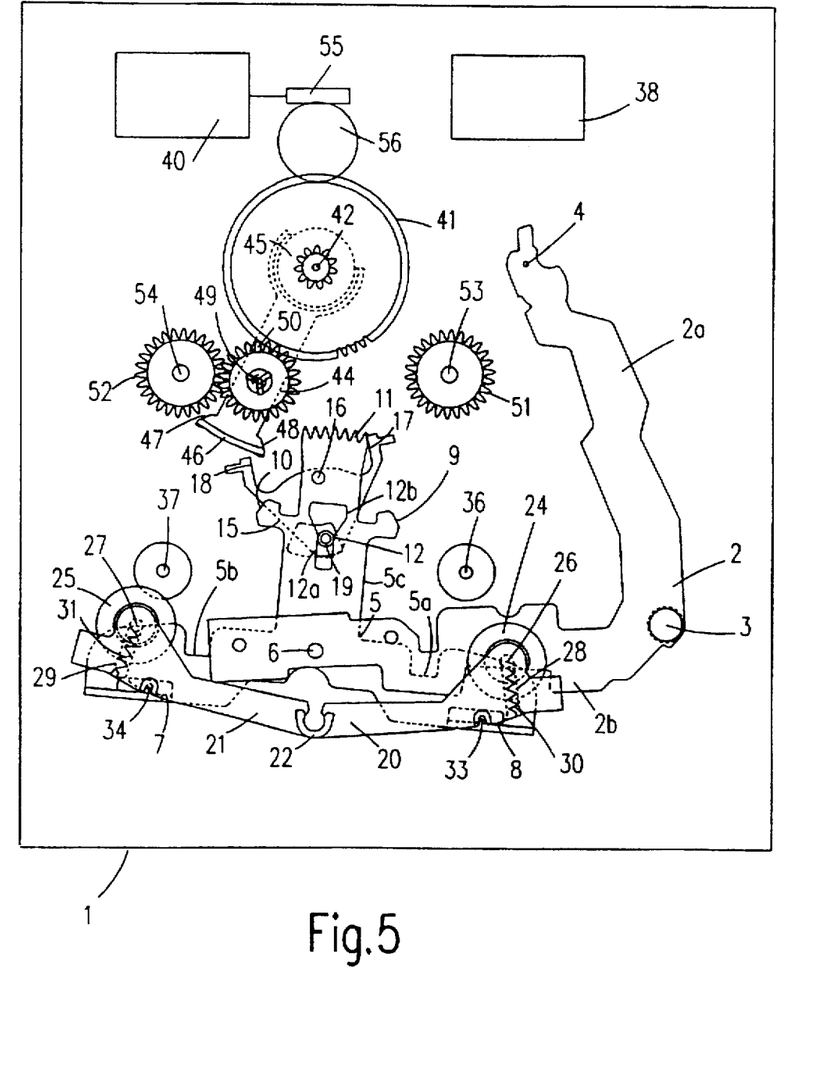
FIG. 5 is a plan view of parts of the auto-reverse deck in a first fast-winding position (Fast REV).

FIG. 5 is a plan view of parts of the auto-reverse deck in a first fast-winding position (Fast Reverse). In comparison with the position shown in FIG. 1 the carrier element 2 has been pivoted counter-clockwise about the pivot 3. During its pivotal movement the pivoting carrier element 2 drives the actuating lever 5, which is mounted on the carrier element 2 so as to be pivotable about the pivot 6. By means of its slots 7 and 8 the actuating lever 5 cooperates with the projections 33 and 34 of the pressure-roller levers 20 and 21. As a result of this, the pressure roller 25 is lifted off the capstan 37 and the magnetic tape, not shown, can be moved past the capstans 36 and 37 by means of the reel-disc wheels 53 and 54, without the pressure rollers 24 and 25 being in contact with the magnetic tape, not shown.

The carrier element 2 can be pivoted counter-clockwise beyond the position shown in FIG. 5 into a stand-by position (Stand-By), in which there is no transport of the magnetic tape. In this stand-by position the actuating lever 5 has been moved out of the pivoting range of the pivotal lever 44. In the stand-by mode the pivotal wheel 50 is not in mesh with any of the reel-disc wheels 53 and 54. Since the actuating lever 5 with its actuating-lever teeth 11 has been moved completely out of the pivoting range of the pivotal lever 44 there is no risk of the pivotal wheel 50 meshing with the actuating-lever teeth 11 of the actuating lever 5 and thereby causing undesirable switching operations in the stand-by mode.

Figure 6:
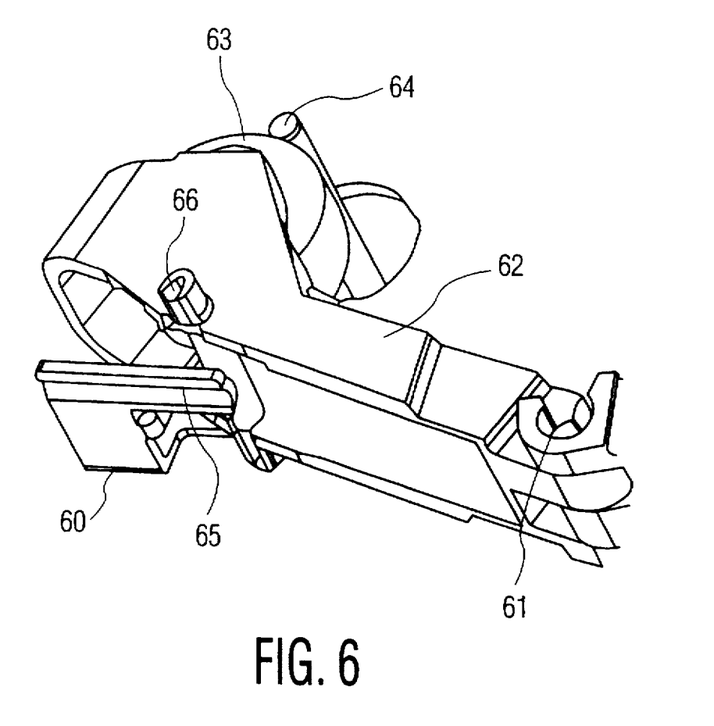
FIG. 6 is a perspective view showing a preferred construction of an actuating lever and a pressure-roller lever.

FIG. 6 is a perspective view showing an actuating lever 60 together with a pressure-roller lever 62 which is pivotable about a pivot 61 and which carries a pressure roller 63 pressed against a capstan 64. The actuating lever 60 has a stop surface 65 which, centered in the height direction of the pressure roller 63, engages against a stop element formed by a pin 66 and mounted on the pressure-roller lever 62. Thus, it is avoided that forces issuing from the pressure roller 63 and acting on the pressure-roller lever 62 cause tilting perpendicularly to the pivotal axis 61 of the pressure-roller lever 62.

We claim:

1. A switching device in an auto-reverse deck for a magnetic-tape-cassette apparatus, comprising:

a deck plate;

a first capstan;

a second capstan;

a first pressure roller lever supported on the deck plate for pivoting movement about a common pivot point disposed on a first line which is substantially mid-perpendicular to a second line interconnecting the first capstan and the second capstan;

a second pressure roller lever supported on the deck plate for pivoting movement about the common pivot point;

a first pressure roller mounted on the first pressure roller lever for engagement with the first capstan when the switching device is in a first operating position for enabling movement of a magnetic tape in a first tape-transport direction;

a second pressure roller mounted on the second pressure roller lever for engagement with the second capstan when the switching device is in a second operating position for enabling movement of the magnetic tape in a second tape-transport direction;

a carrier element mounted on the deck plate;

a magnetic head positioned on the carrier element for selective movement between a plurality of different positions relative to a transport path of the magnetic tape; and, an actuating lever mounted on the carrier element and coupled to the first and second pressure roller levers for movement between a first lever operating position and a second lever operating position in response to a change in the tape-transport direction, wherein the actuating lever moves each of the first and second pressure rollers from a respective first roller operating position to a respective second roller operating position in response to movement of the actuating lever from the first lever operating position to the second lever operating position.

2. The switching device as set forth in claim 1, further comprising:

a first slot provided in the first pressure roller lever, wherein the first pressure roller is movable in the first slot;

a second slot provided in the second pressure roller lever, wherein the second pressure roller is movable in the second slot;

a first spring for restraining movement of the first pressure roller relative to the first pressure roller lever; and, a second spring for restraining movement of the second pressure roller relative to the second pressure roller lever.

3. The switching device as set forth in claim 1, wherein:

the actuating lever includes first and second guide openings;

the first pressure roller lever includes a first guide element which engages the first guide opening; and, the second pressure roller lever includes a second guide element which engages the second guide opening.

4. The switching device as set forth in claim 3, wherein:

the first and second guide openings comprise first and second projections, respectively; and, the first and second guide openings comprise first and second slots, respectively.

5. The switching device as set forth in claim 1, wherein:

the actuating lever includes first and second stop surfaces centered with respect to a height direction of respective ones of the first and second pressure rollers; and, the first pressure roller levers include a first stop element the second pressure roller lever inclues a second stop element;

the first stop surface is engageable with the first stop element; and, the second stop surface is engageable with the second stop element.

6. The switching device as set forth in claim 1, wherein the actuating lever is pivotably mounted on the carrier element.

7. The switching device as set forth in claim 1, wherein:

the deck plate includes at least two reference elements arranged thereon; and, the position of the actuating lever in both the first and second lever operating positions is defined by the reference elements.

8. The switching device as set forth in claim 1, wherein:

upon a reversal of the tape-transport direction, the carrier element and the actuating lever are initially moved away from the transport path of the magnetic tape, and then the actuating lever and the first and second pressure roller levers are pivoted, and then the carrier element and the actuating lever are moved towards the transport path of the magnetic tape.

9. A switching device in an auto-reverse deck for a magnetic-tape-cassette apparatus, comprising:

a deck plate;

a first capstan;

a second capstan;

a first pressure roller lever supported on the deck plate;

a second pressure roller lever supported on the deck plate;

a first pressure roller mounted on the first pressure roller lever for engagement with the first capstan when the switching device is in a first operating position for enabling movement of a magnetic tape in a first tape-transport direction;

a second pressure roller mounted on the second pressure roller lever for engagement with the second capstan when the switching device is in a second operating position for enabling movement of the magnetic tape in a second tape-transport direction;

a carrier element mounted on the deck plate;

a magnetic head positioned on the carrier element for selective movement between a plurality of different positions relative to a transport path of the magnetic tape;

an actuating lever mounted on the carrier element and coupled to the first and second pressure roller levers for movement between a first lever operating position and a second lever operating position in response to a change in the tape-transport direction, wherein the actuating lever moves each of the first and second pressure rollers from a respective first roller operating position to a respective second roller operating position in response to movement of the actuating lever from the first lever operating position to the second lever operating position;

a first reel-disc wheel;

a second reel-disc wheel;

a drive mechanism which has a pivotal wheel which is pivotable in a pivoting range between the first and the second reel-disc wheels;

wherein the first reel-disc wheel is drivable by the drive mechanism when the switching device is in the first operating position, and the second reel-disc wheel is drivable by the drive mechanism when the switching device is in the second operating position; and, wherein the actuating lever has teeth which are engageable with the pivotal wheel of the drive mechanism, the actuating lever teeth and the pivotal wheel being in mesh in a central part of the pivoting range and not in mesh in an initial part and a final part of the pivoting range, whereby the pivotal wheel of the drive mechanism exerts a force on the actuating lever only in the central part of the pivoting range.

10. The switching device as set forth in claim 9, further comprising:

an intermediate wheel;

a pivotal lever;

a frictional coupling which couples the pivotal lever to the intermediate wheel by a frictional force transmitted by the frictional coupling;

a pivotably supported armature lever whose pivotal movement is controlled by the movement of the actuating lever;

wherein the armature lever includes a stop edge in the central part of the pivoting range;

wherein the pivotal wheel is mounted on the pivotal lever;

wherein the pivotal wheel is pivoted in the initial and final part of the pivoting range by the frictional force transmitted by the frictional coupling; and, the pivotal lever engages the stop edge of the armature lever in the central part of the pivoting range, whereby meshing forces are transmitted to the teeth of the actuating lever by the intermediate wheel and the pivotal wheel, as a result of which the actuating lever is pivoted.

11. The switching device as set forth in claim 10, wherein the armature lever is pivotably supported on the deck plate.

12. The switching device as set forth in claim 9, wherein:

the actuating lever includes a guide opening; and, the armature lever includes a guide element which engages the guide opening in the actuating lever.

13. The switching device as set forth in claim 12, wherein the guide opening in the actuating lever comprises a slot having first and second parts of different width, the width of the first part being relatively narrow and corresponding substantially to the width of the guide element, and the width of the second part being relatively broad and larger than the width of the guide element.

* * * * *